(12) United States Patent
Kyllonen et al.

(10) Patent No.: US 9,202,350 B2
(45) Date of Patent: Dec. 1, 2015

(54) USER INTERFACES AND ASSOCIATED METHODS

(71) Applicant: Nokia Corporation Oy, Espoo (FI)

(72) Inventors: Janne Vihtori Kyllonen, Haukipudas (FI); Ashley Colley, Oulu (FI)

(73) Assignee: Nokia Technologies Oy, Espoo (FI)

( * ) Notice: Subject to any disclaimer, the term of this patent is extended or adjusted under 35 U.S.C. 154(b) by 135 days.

(21) Appl. No.: 13/720,228

(22) Filed: Dec. 19, 2012

(65) Prior Publication Data

US 2014/0167942 A1  Jun. 19, 2014

(51) Int. Cl.
| | |
|---|---|
| *G08B 6/00* | (2006.01) |
| *G06F 3/01* | (2006.01) |
| *G06F 3/0488* | (2013.01) |
| *G06F 3/0481* | (2013.01) |

(52) U.S. Cl.
CPC *G08B 6/00* (2013.01); *G06F 3/016* (2013.01); *G06F 3/0488* (2013.01); *G06F 3/04812* (2013.01); *G06F 3/04883* (2013.01); *G06F 2203/014* (2013.01)

(58) Field of Classification Search
CPC . G06F 3/016; G06F 3/04812; G06F 3/04815; G08B 6/00
USPC .............. 340/407.1, 407.2; 345/173
See application file for complete search history.

(56) References Cited

U.S. PATENT DOCUMENTS

| | | | |
|---|---|---|---|
| 7,196,688 B2 | 3/2007 | Schena | |
| 8,576,171 B2 * | 11/2013 | Grant | 345/163 |
| 8,686,952 B2 * | 4/2014 | Burrough et al. | 345/173 |
| 8,791,962 B2 * | 7/2014 | Noda et al. | 345/642 |
| 2002/0054060 A1 | 5/2002 | Schena | |
| 2004/0164971 A1 | 8/2004 | Hayward et al. | |
| 2006/0066569 A1 | 3/2006 | Eid et al. | |
| 2006/0103634 A1 | 5/2006 | Kim et al. | |
| 2007/0057913 A1 | 3/2007 | Eid et al. | |
| 2007/0106457 A1 | 5/2007 | Rosenberg | |
| 2007/0139375 A1 * | 6/2007 | Rosenberg et al. | 345/161 |
| 2007/0152974 A1 | 7/2007 | Kim et al. | |
| 2007/0152982 A1 | 7/2007 | Kim et al. | |
| 2007/0236449 A1 | 10/2007 | Lacroix et al. | |
| 2008/0143693 A1 | 6/2008 | Schena | |
| 2008/0229206 A1 * | 9/2008 | Seymour et al. | 715/727 |
| 2008/0303796 A1 | 12/2008 | Fyke | |
| 2009/0007758 A1 | 1/2009 | Schlosser et al. | |
| 2009/0091430 A1 | 4/2009 | Ryan et al. | |

(Continued)

FOREIGN PATENT DOCUMENTS

| | | | |
|---|---|---|---|
| EP | 2 405 403 A1 | 1/2012 | |
| WO | WO 2008/037275 A1 | 4/2008 | |

(Continued)

OTHER PUBLICATIONS

International Search Report and Written Opinion from International Application No. PCT/EP2013/076758, mailed May 16, 2014.

(Continued)

*Primary Examiner* — Eric M Blount
(74) *Attorney, Agent, or Firm* — Alston & Bird LLP (57) ABSTRACT

An apparatus and method for enabling the provision of differential haptic feedback to a user based on a particular degree of spatial interaction between a plurality of different user interface elements of a graphical user interface.

19 Claims, 5 Drawing Sheets

(56) References Cited

U.S. PATENT DOCUMENTS

| | | |
|---|---|---|
| 2009/0128376 A1 | 5/2009 | Caine et al. |
| 2009/0189873 A1 | 7/2009 | Peterson et al. |
| 2009/0195861 A1 | 8/2009 | Jendbro et al. |
| 2009/0219252 A1* | 9/2009 | Jarventie et al. ............ 345/173 |
| 2009/0262091 A1 | 10/2009 | Ikeda et al. |
| 2010/0156818 A1 | 6/2010 | Burrough et al. |
| 2010/0231550 A1* | 9/2010 | Cruz-Hernandez et al. .. 345/174 |
| 2011/0029864 A1 | 2/2011 | Stewart et al. |

FOREIGN PATENT DOCUMENTS

| | | |
|---|---|---|
| WO | WO 2011/159605 A1 | 12/2011 |
| WO | WO 2014/006799 A1 | 1/2014 |

OTHER PUBLICATIONS

European Search Report and Opinion from European Patent Application No. 10 854 980.9, dated Dec. 16, 2013.

Gruneber, K, et al.; "Deliverable D3.2 MVC/SVC Storage Format"; Information and Communication Technologies (ICT) Programme, Project No: FP7-ict-214063, SEA; Jan. 29, 2009; XP055054524; Retrieved from the Internet: URL: http://www.ist-sea.eu/Public/SEA_D3.2_HH_FF_20090129.pdf [retrieved on Feb. 26, 2013].

"$3^{rd}$ Generation Partnership Project; Technical Specification Group Services and System Aspects Transparent end-to-end Packet-switched Streaming Service (PSS); HTTP-based Streaming and Download (HSD)(Release 10)", 3GPP Draft; Draft TS 26.2XX-HSD-V0.0.3, $3^{RD}$ Generation Partnership Project (3GPP), Mobile Competence Centre; 650, Route Des Lucioles; F-06921 Sophia-Antipolis Cedex; France; vol. SA WG4, No. Prague, Czech Republic; Jun. 21, 2010, Jun. 23, 2010; XP050460440; [retrieved on Jun. 23, 2010].

Amon P. et al; "File Format for Scalable Video Coding"; IEEE Transactions on Circuits and Systems for Video Technology, IEEE Service Center, Piscataway, NJ, US; vol. 17, No. 9; Sep. 1, 2007; pp. 1174-1185; XP011193013.

Meers, S. et al., *Haptic Gaze-Tracking Based Perception of Graphical User Interfaces*, Faculty of Informatics—Papers (Archive), University of Wollongong (2007) 7 pages.

* cited by examiner

USER INTERFACES AND ASSOCIATED METHODS

TECHNICAL FIELD

The present disclosure relates to user interfaces and user interface elements, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is common for electronic devices to provide a user interface (e.g. a graphical user interface). A user interface may enable a user to interact with an electronic device, for example, to open applications using application icons, enter commands, to select menu items from a menu, or to enter characters using a virtual keypad.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus, the apparatus comprising:
  at least one processor; and
  at least one memory including computer program code,
  the at least one memory and the computer program code configured, with the at least one processor, to cause the apparatus to perform at least the following:
  enable the provision of differential haptic feedback based on the particular spatial interaction between a plurality of user interface elements of a graphical user interface.

Such differential haptic feedback may allow the user to recognise/inspect a spatial interaction between a plurality of user interface elements using the sense of touch. This may be particularly useful when the spatial interaction is obscured (e.g. either wholly or partially by the user's finger/stylus or by one or more of the user interface elements themselves).

The differential haptic feedback may (or may not) be additional haptic feedback provided when the plurality of user interface elements are spatially interacting which is not provided when the plurality of user interface elements are not interacting.

The apparatus may be configured to enable the provision of the differential haptic feedback in the spatial interaction region of the plurality of user interface elements. The apparatus may be configured to enable provision of a first haptic feedback in the spatial interaction region of the plurality of user interface elements and a second different haptic feedback in the spatial region outside the interaction region of the plurality of user interface elements. This may be considered to be location specific differential haptic feedback. This may allow a user to receive information relating to the spatial interaction whether or not the user is interacting with the spatial interaction region.

The apparatus may be configured to provide the differential haptic feedback in locations which are not related to the spatial interaction region. This may be considered to be global differential haptic feedback.

A plurality of user interface elements may be considered to interact when they come into contact (e.g. abut or have contiguous edges and/or surfaces) and/or when they overlap (e.g. lie or extend over and cover part of; or have an area, extent or range in common).

The apparatus may be configured such that the haptic feedback is dependent on one or more of:
  the particular degree of overlap between the plurality of user interface elements (e.g. related to the area or volume of the overlap); and
  the particular degree of contact between the plurality of user interface elements (e.g. related to the length of a line segment or the area of a surface shared by contiguous boundaries of the plurality of user interface element).

The apparatus may be configured to enable the provision of the haptic feedback when the spatial interaction between the plurality of user interface elements is changing. The apparatus may be configured to enable the provision of the haptic feedback when the spatial interaction between the plurality of user interface elements is not changing.

The apparatus may be configured to enable the provision of the differential haptic feedback in response to stylus being detected within the detection range of the graphical user interface. The apparatus may be configured to enable the provision of the differential haptic feedback in real time as the user is interacting with the user interface elements (e.g. when the user is providing input, such as stationary or sliding input to the graphical user interface). It will be appreciated that not providing the differential haptic feedback continuously may reduce energy requirements.

An input may comprise a single-touch or multi-touch gesture. The input could, of course, not be touch input, but could be input using a mouse, a touchpad, or other separate and/or external input device, for example.

The apparatus may be configured to provide differential haptic feedback provided to one of the plurality of user interface elements based on haptic feedback associated with the user interface elements when the user interface elements are not spatially interacting. For example, if the plurality of user interface elements have a cloth texture, the differential haptic feedback may also have a cloth texture (e.g. a rougher cloth texture). This may provide a more consistent and/or intuitive user experience.

The apparatus may be configured such that the differential haptic feedback is dependent on which of the plurality of user interface elements overlies with which other spatially interacting user interface element. This may provide tactile information to the user relating to which user interface element is overlying which other user interface elements.

The apparatus may be configured to provide differential haptic feedback by changing one or more of:
- the waveform of the haptic feedback (i.e. the shape and/or frequency of the haptic wave);
- the consistency of haptic feedback (e.g. whether the haptic feedback is provided intermittently or constantly);
- the strength of haptic feedback (e.g. the amplitude of an electro tactile wave).

It will be appreciated that these examples may be considered to change the type of the haptic feedback.

The apparatus may be configured to determine the spatial interaction.

The spatial interaction may comprise a spatial interaction in at least one of one, two and three dimensions.

At least one of the plurality of user interface elements may be selectable to actuate an associated function performable using an electronic device. The function might include opening an application, opening a file, or entering or formatting textual characters. A textual character may comprise a combination of one or more of a word, a letter character (e.g. from the Roman, Greek, Arabic or Cyrillic alphabets), a graphic character (e.g. a sinograph, Japanese kana or Korean delineation), a numeral, a phrase, a syllable, a diacritical mark, an emoticon, and a punctuation mark.

A said user interface element may be an object provided by the graphical user interface which can be manipulated by the user. Such an object may not be used to perform a function of an electronic device. The spatial interaction may result from manipulation (e.g. by the user) of one or more of the plurality of user interface elements The haptic feedback may be provided using one or more of: a touch screen, an array of haptic actuators; piezo-transducers, electro-active polymers, and electro tactile materials.

The apparatus may comprise one or more of a touch screen, an array of haptic actuators; piezo-transducers, electro-active polymers, and electro tactile materials to provide the differential haptic feedback. The apparatus may comprise the graphical user interface to provide the plurality of user interface elements as display outputs.

The apparatus may be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

According to a further aspect, there is provided a method, the method comprising:
- enabling the provision of differential haptic feedback based on the particular spatial interaction between a plurality of user interface elements of a graphical user interface.

According to a further aspect, there is provided a computer program comprising computer program code, the computer program code being configured to perform at least the following:
- enable the provision of differential haptic feedback based on the particular spatial interaction between a plurality of user interface elements of a graphical user interface.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product.

According to a further aspect there is provided an apparatus comprising:
- means for enabling configured to enable the provision of differential haptic feedback based on the particular spatial interaction between a plurality of user interface elements of a graphical user interface According to a further aspect there is provided an apparatus comprising:
- an enabler configured to enable the provision of differential haptic feedback based on the particular spatial interaction between a plurality of user interface elements of a graphical user interface.

According to a further aspect, there is provided an apparatus, the apparatus comprising:
- at least one processor; and
- at least one memory including computer program code,
- the at least one memory and the computer program code configured, with the at least one processor, to cause the apparatus to perform at least the following:
- enable the provision of differential haptic feedback associated with a particular user interface element based on the layer of the graphical user interface which the user interface element occupies.

According to a further aspect, there is provided a method, the method comprising:
- enabling the provision of differential haptic feedback associated with a particular user interface element based on the layer of the graphical user interface which the user interface element occupies.

According to a further aspect, there is provided a computer program comprising computer program code, the computer program code being configured to perform at least the following:
- enable the provision of differential haptic feedback associated with a particular user interface element based on the layer of the graphical user interface which the user interface element occupies.

The present disclosure includes one or more corresponding aspects, embodiments or features in isolation or in various combinations whether or not specifically stated (including claimed) in that combination or in isolation. Corresponding means and corresponding function units (e.g. a determiner, an enabler) for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS/EMBODIMENTS

It is common for an electronic device to have a user interface (which may or may not be graphically based) to allow a user to interact with the device to enter and/or interact with information. For example, the user may use a keyboard user interface to enter text, or use icons to open applications. Some user interfaces include displays, such as touch screens, which can display information to the user.

On a touch screen, when arranging multiple user interface elements (e.g. icons, windows) the user may only receive visual feedback of the objects relative positions, and this may be somewhat obscured by the fingers which are controlling the user interface elements.

This disclosure relates to providing differential haptic feedback based on the spatial interaction between a plurality of user interface elements. This may allow the user to receive tactile information on the spatial interaction as well as or instead of visual information. The differential haptic feedback may provide information on when items are touching and/or overlapping each other and, in some cases, on the degree to which the items are overlapping each other. It will be appreciated that by providing differential feedback, the user interface may more accurately replicate the touch sense a user would experience when interacting with physical objects. Therefore, embodiments may provide a more intuitive and immersive user experience.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

Figure 1:
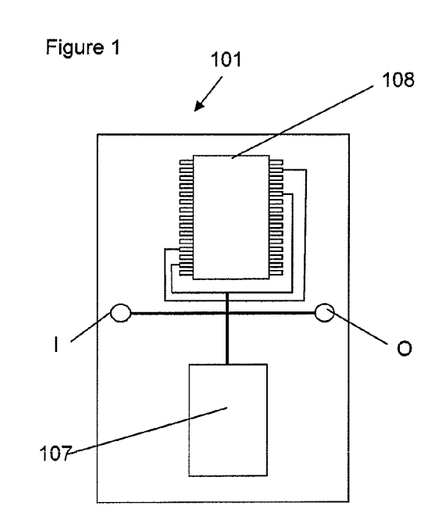
FIG. 1 depicts an example apparatus embodiment comprising a number of electronic components, including memory and a processor.

FIG. 1 shows an apparatus 101 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 101 is an Application Specific Integrated Circuit (ASIC) for a portable electronic device with a touch sensitive display. In other embodiments the apparatus 101 can be a module for such a device, or may be the device itself, wherein the processor 108 is a general purpose CPU of the device and the memory 107 is general purpose memory comprised by the device.

The input I allows for receipt of signalling to the apparatus 101 from further components, such as components of a portable electronic device (like a touch-sensitive display) or the like. The output O allows for onward provision of signalling from within the apparatus 101 to further components. In this embodiment the input I and output O are part of a connection bus that allows for connection of the apparatus 101 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 108, 107. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
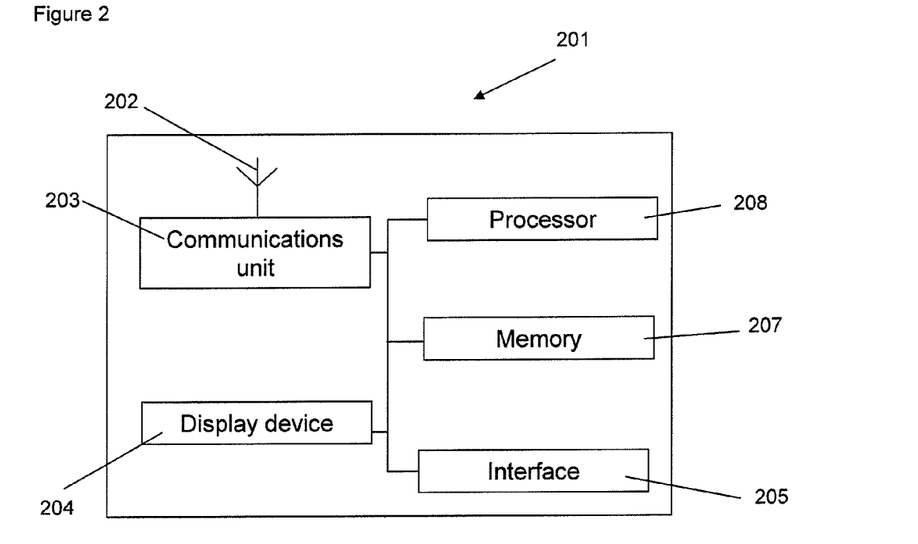
FIG. 2 depicts an example apparatus embodiment comprising a number of electronic components, including memory, a processor and a communication unit.

FIG. 2 depicts an apparatus 201 of a further example embodiment, such as a mobile phone. In other example embodiments, the apparatus 201 may comprise a module for a mobile phone (or PDA or audio/video player), and may just comprise a suitably configured memory 207 and processor 208. The apparatus in certain embodiments could be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same The example embodiment of FIG. 2, in this case, comprises a display device 204 such as, for example, a Liquid Crystal Display (LCD) or touch-screen user interface. The apparatus 201 of FIG. 2 is configured such that it may receive, include, and/or otherwise access data. For example, this example embodiment 201 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 201 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
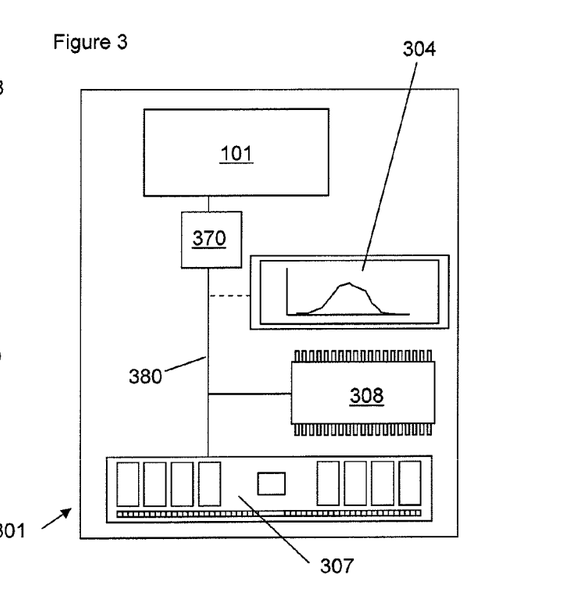
FIG. 3 depicts an example apparatus embodiment comprising a number of electronic components, including memory, a processor and a communication unit.

FIG. 3 depicts a further example embodiment of an electronic device 301, such as a tablet personal computer, a portable electronic device, a portable telecommunications device, a server or a module for such a device, the device comprising the apparatus 101 of FIG. 1. The apparatus 101 can be provided as a module for device 301, or even as a processor/memory for the device 301 or a processor/memory for a module for such a device 301. The device 301 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the Internet by the processor.

The apparatus 101 in FIG. 3 is connected (e.g. electrically and/or wirelessly) to an input/output interface 370 that receives the output from the apparatus 101 and transmits this to the device 301 via data bus 380. Interface 370 can be connected via the data bus 380 to a display 304 (touch-sensitive or otherwise) that provides information from the apparatus 101 to a user. Display 304 can be part of the device 301 or can be separate. The device 301 also comprises a processor 308 configured for general control of the apparatus 101 as well as the device 301 by providing signalling to, and receiving signalling from, other device components to manage their operation.

The storage medium 307 is configured to store computer code configured to perform, control or enable the operation of the apparatus 101. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

FIGS. 4a-4d depicts an example embodiment of the apparatus depicted in FIG. 2 comprising a portable electronic communications device 401, e.g. such as a mobile phone, with a user interface comprising a touch screen user interface 405, 404, a memory (not shown), a processor (not shown) and an antenna (not shown) for transmitting and/or receiving data (e.g. emails, textual messages, phone calls, information corresponding to web pages). The touch screen 405, 404 in this case is configured to provide haptic feedback using electrostatic tactile technology.

In this case, the apparatus/device is configured determine the spatial interaction; and to enable the provision of differential haptic feedback (al least the signalling required to provide for the differential haptic feedback) based on the particular spatial interaction between a plurality of user interface elements of a graphical user interface. It will be appreciated that certain embodiments of the apparatus need not necessarily comprise the graphical user interface or the haptic actuators, for example, as long as the apparatus (e.g. processor/memory) are configured to provide the appropriate signalling to enable the provision of the differential haptic feedback.

In this case, the apparatus is configured to provide global differential haptic feedback when the user is manipulating the user interface elements to change the spatial interaction in a region not related to the interaction region (e.g. to alert the user that the spatial interaction is changing regardless of where on the screen the user is interacting), and also location specific differential haptic feedback to indicate the location and/or the extent of the spatial interaction when the spatial interaction between the plurality of user interface elements is not changing (e.g. when the user is examining the spatial interaction between the plurality of user interface elements). In other embodiments, one of location specific and global differential haptic feedback may be provided. It will be appreciated that the location specific differential haptic feedback may also be provided when the spatial interaction between the plurality of user interface elements is changing.

Figures 4A, 4B, 4C, 4D:
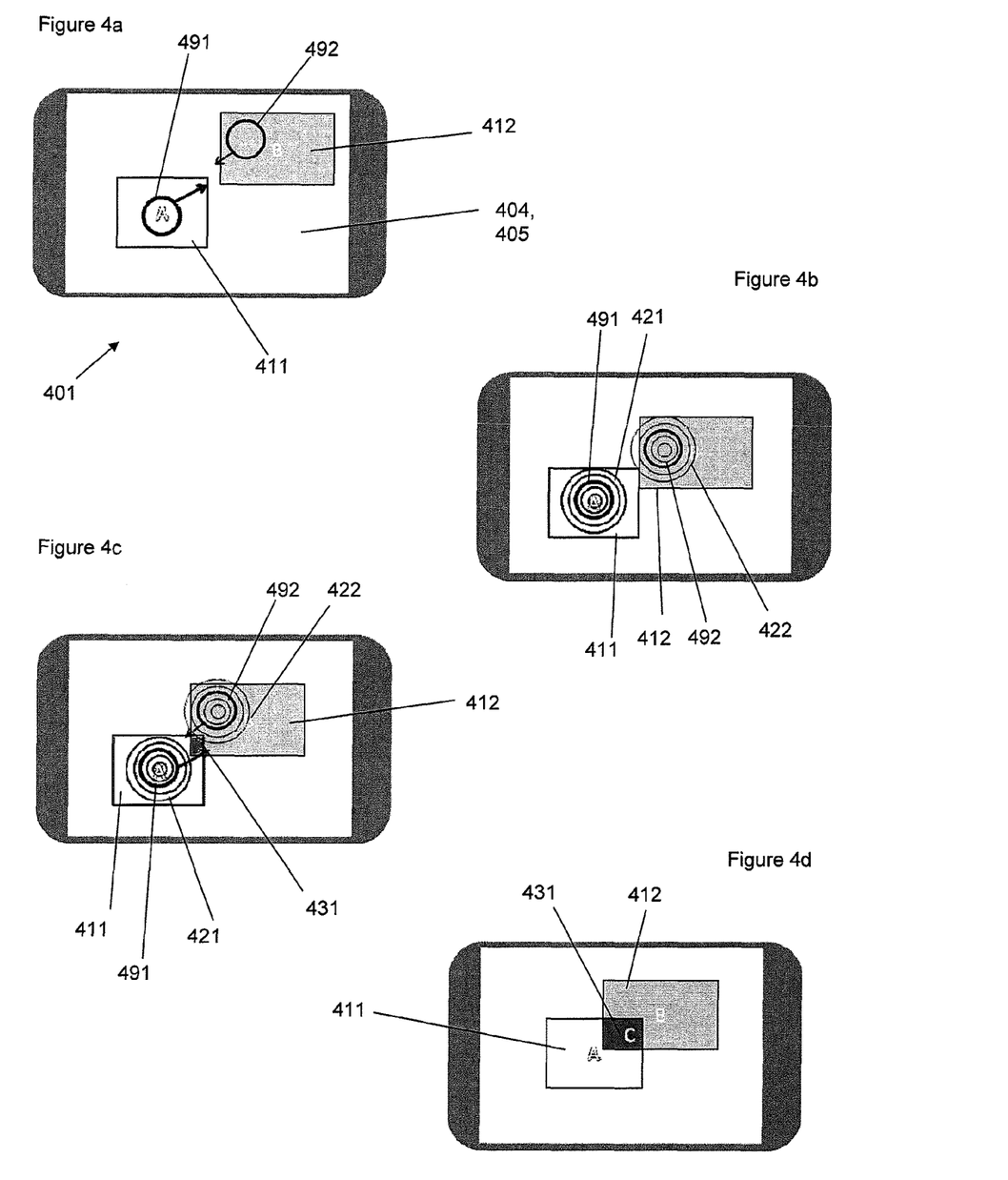
FIG. 4a-4d depicts an example embodiment wherein the user interface elements are windows.

In the situation shown in FIG. 4a, the user is moving first and second window graphical user interface elements 411, 412 across the screen using his fingers 491, 492. These window graphical user interface elements 411, 412 represent application instances such as text documents and/or web browser windows. In this case, the apparatus/device is configured to provide global differential haptic feedback when the spatial interaction between the plurality of window graphical user interface elements is changing. In FIG. 4a, the graphical user interface elements 411, 412 are spaced apart and so are not spatially interacting on the touch screen 404, 405. In this case, when the graphical user interfaces are not spatially interacting, no global differential haptic feedback is provided.

As the user brings the graphical user interface elements together (by dragging using his fingers 491, 492 or other styli), the window graphical user interface elements 411, 412 touch (and thereby spatially interact), as shown in FIG. 4b. When the plurality of user interface elements 411, 412 are spatially interacting, the apparatus/device is configured to enable the provision of global differential haptic feedback 421, 422 to the users fingers based on the particular spatial interaction. In certain embodiments, this differential haptic feedback (with respect to a non-interacting configuration) may remain constant regardless of the degree of interaction. Also, in other embodiments, the differential haptic feedback may stop after the initial detected interaction.

However, in this case, the strength of the global differential haptic feedback is dependent on the particular degree of overlap between the plurality of user interface elements 411, 412 (i.e. on the area of overlap area 431). In the case of contact, as shown in FIG. 4b, the extent of overlap is small so the strength of the global differential haptic feedback 421, 422 is correspondingly small. In this case, when the user is manipulating the user interface elements by moving them, the apparatus/device is configured to provide global differential haptic feedback 421, 422 at the position of the stylus/styli (which in this case is the user's finger/fingers 491, 492) as shown in FIG. 4b. That is, the differential haptic feedback is provided in real time as the user is interacting with the user interface elements.

It will be appreciated that the global differential haptic feedback provided is in addition to, and in certain embodiments distinct from, the haptic feedback provided when the user interface elements are not spatially interacting.

In this embodiments, when the user brings the window user interface elements together such that the overlap increases (as shown in FIG. 4c), the strength of the global differential haptic feedback 421, 422 increases correspondingly (e.g. by increasing the amplitude of the electro tactile waveform).

In this embodiment, when the user releases the window user interface elements 411, 412, they are configured to remain statically in position. When the user interface elements are static, the spatial interaction between the plurality of user interface elements is not changing so the global differential haptic feedback ceases. However, when the spatial interaction between the plurality of user interface elements is not changing the apparatus is configured to provide location specific differential haptic feedback at different locations on the touch screen user interface. That is, the apparatus/device is configured to provide first haptic feedback in the spatial interaction region 431 of the plurality of user interface elements 411, 412 and a second different haptic feedback in the spatial region outside the interaction region of the plurality of user interface elements 411, 412. In this case, the first and second haptic feedback is generated by providing different waveforms (e.g. corresponding to different textures) for the interaction region 431 than for the portions of the user interface elements outside the interaction region.

In this case, by providing location specific differential spatial haptic feedback which indicates which portion or portions of the plurality of user interface elements are interacting, the user can detect a different surface texture between the overlapping portions 431 of the user interface elements and the non-overlapped portions of the user interface elements 411, 412 by moving his finger across the surface of the touch screen. That is, in this case, the texture of the overlapping area 431 of the two user interface elements is different to the haptic texture of the non-overlapping areas.

It will be appreciated that the device/apparatus may be configured to enable the provision of the differential haptic feedback only when a stylus is detected within the detection range of the graphical user interface.

Figures 5A, 5B:
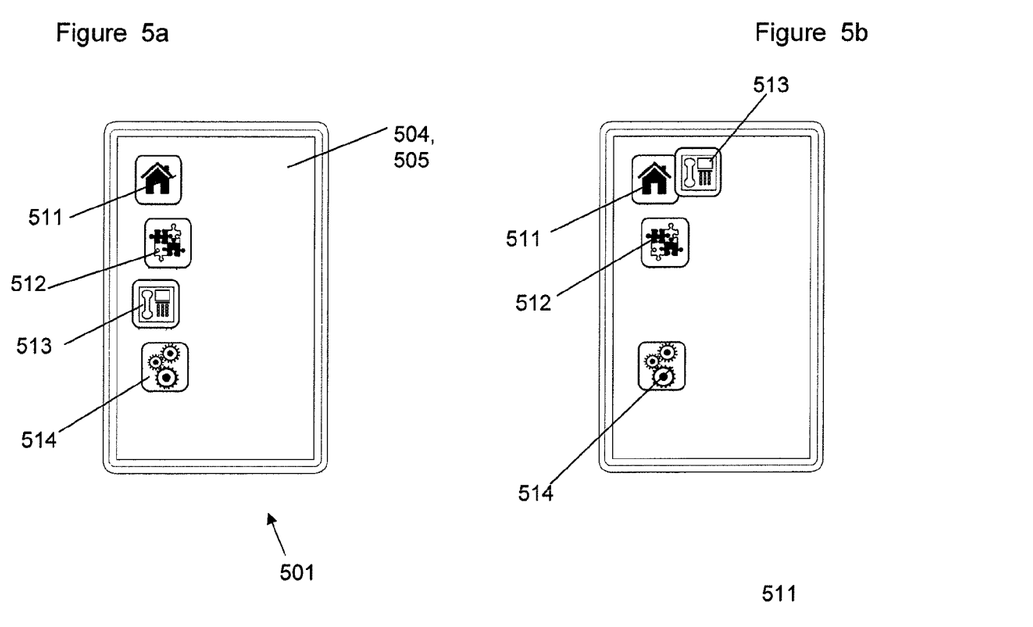
FIG. 5a-5d depicts a further example embodiment wherein the user interface elements are icons.

FIG. 5*a* shows a further example embodiment of the apparatus depicted in FIG. 2 comprising a portable electronic communications device 501, e.g. such as a mobile phone, with a user interface comprising a touch-screen user interface 505, 504, a memory (not shown), a processor (not shown) and an antenna (not shown) for transmitting and/or receiving data (e.g. emails, textual messages, phone calls, information corresponding to web pages).

In this example, the display of the mobile phone is configured to display a number of icon user interface elements 511-514. Each icon user interface element 511-514 is selectable to actuate an associated function performable using the electronic device. In this case, there are icon user interface elements corresponding to the functions of navigating to a home screen of the electronic device 511; opening a games application 512; opening a telephone call application 513; and opening a settings menu 514. In this case, each of the user interface elements can be manipulated by the user to provide for moving and/or resizing of the icons.

In this example, the user uses the telephone icon user interface element most frequently, and so wants it to be at the top and enlarged for ease of use. To do this, the user selects and moves the telephone icon user interface element 513 and moves it towards the top using a dragging gesture using the touch screen graphical user interface. In this embodiment, each user icon occupies a different layer within the graphical user interface which dictates which user interface element overlies which other user interface elements when they overlap. In this case, the telephone user interface element 513 occupies a layer which is above the layer occupied by the home screen user interface element 511.

In this case, the user interface is configured to provide each of the user interface elements 511-514 with a different texture (e.g. even when they are not spatially interacting), so that a user can distinguish between the user interface elements by touch. In this case, the telephone user interface element 513 is configured to have a sandy feel, whereas the home screen user interface element 511 is configured to have the feeling of cloth. In this case, the haptic feedback is provided using ElectroActive Polymer technology. It will be appreciated that other embodiments may use haptic actuators, piezo-transducers, electro-active polymers or other haptic technologies.

As the user brings the telephone user interface element 513 towards the home screen user interface element 511 (as shown in FIG. 2*a*) the telephone user interface element 513 overlaps the home screen user interface element 511. Because the telephone user interface element 513 occupies a layer above the home screen user interface element 511, when the two user interface elements are overlapping, the telephone user interface element 513 obscures the home screen user interface element because it overlies the home screen user interface element 511.

In this case, when the telephone user interface element is spatially interacting with the home screen user interface element by overlapping the home screen user interface element, the apparatus/device is configured to enable the provision of location specific differential haptic feedback based on the particular spatial interaction between a plurality of user interface elements of the graphical user interface. In this case, the apparatus/device is configured to increase the roughness of the texture of the overlying user interface element (which in this case is the telephone user interface element 513) in the spatially interacting region (i.e. thereby providing a different first haptic feedback in the spatial interaction region 531 of the plurality of user interface elements than the second haptic feedback provided outside the spatial interaction region).

So in this example, the roughness of the sandy texture of the telephone user interface is increased in the portion which is overlapping the home screen user interface element. It will be appreciated, that if the home screen user interface element was on top of/overlying the telephone user interface element, the overlapping spatial interaction region 531 would have a cloth feel, the texture of the cloth being rougher than the feel of the portion of the home screen user interface element which is outside the interaction region of the spatial region of the plurality of user interface elements.

Figure 5C:
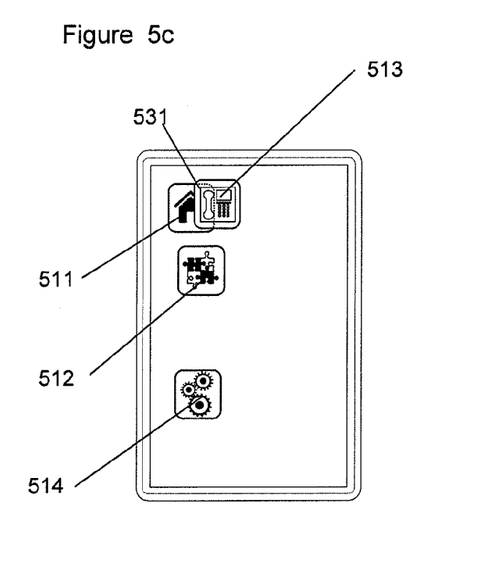

As the user moves the telephone user interface element such that the degree (area) of overlap increases, the user detected roughness of the overlapping spatial interaction region increases.

Figure 5D:
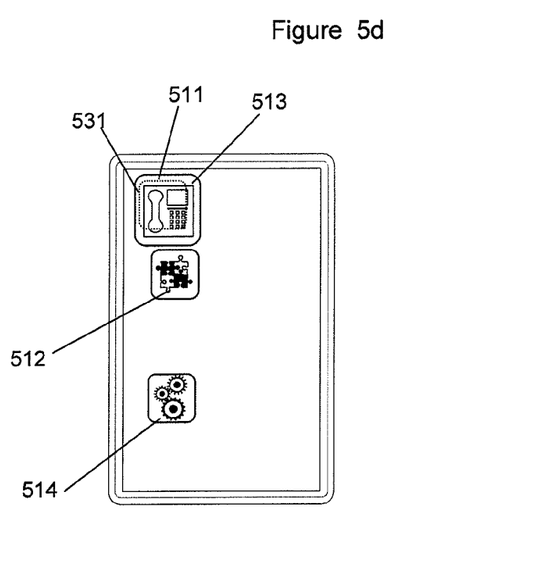

In the situation depicted in FIG. 5*d*, the user has finished positioning the telephone user interface element and has enlarged the telephone user interface element such that it completely overlies the home screen user interface element 511. Although the underlying home screen user interface element 511 is completely obscured (the dotted lines in FIGS. 5*c* and 5*d* are for guidance only), by providing differential haptic feedback in the respective regions of overlap/non-overlap (both of which obscure underlying objects), the user can determine where the home screen user interface element is located using touch (e.g. even if, as in this case, the home screen user interface element is visually obscured by an overlying user interface element). That is, a different feedback would be provided within the perimeter defined by 531 and outside the perimeter 531 but within the area of the user interface element 513.

It will be appreciated that embodiments which are configured such that user interface elements occupy different layers may enable the provision of differential haptic feedback associated with a particular user interface element based on the layer of the graphical user interface which the user interface element occupies. For example, the user interface elements towards the top may have a smoother texture than the user interface elements towards the bottom. This may allow the user to determine which layer the particular user interface element occupies without having to move the user interface elements around such that they overlap (to get a visual indication).

FIG. 6 shows a further example embodiment of the apparatus depicted in FIG. 2 comprising a electronic device 601, e.g. such as a desktop computer, comprising: a user interface having a display 604 and a mouse 605 (unlike the touch screen user interfaces of the embodiments of FIGS. 4 and 5); a memory (not shown); a processor (not shown) and an network connection (not shown) for transmitting and/or receiving data (e.g. emails, textual messages, phone calls, information corresponding to web pages). This may allow the user to find an obscured user interface element without having to move other user interface elements around.

Figures 6A, 6B, 6C:
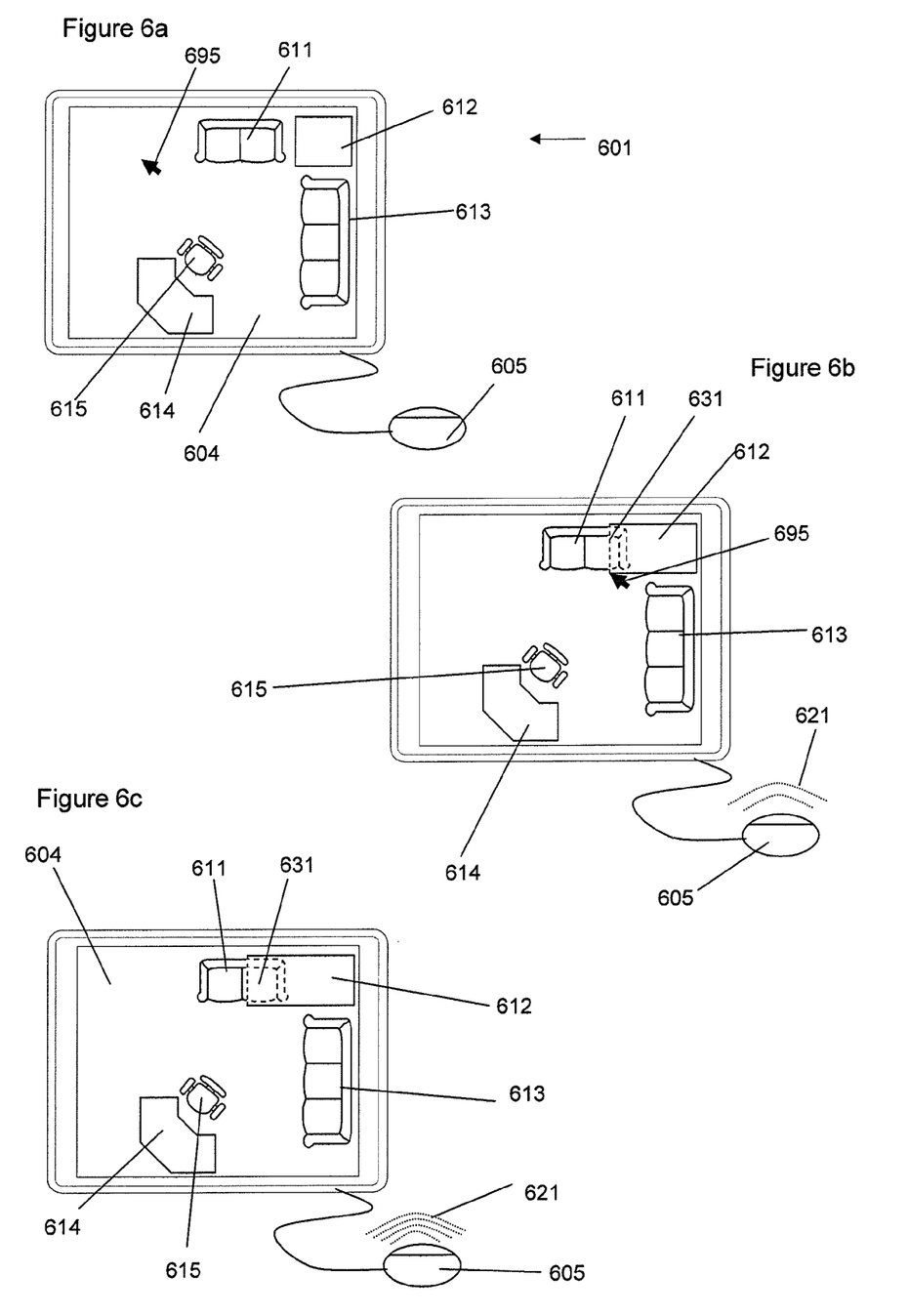
FIG. 6a-6c depicts a further example embodiment wherein the user interface elements can be manipulated by the user.

In this case, the user is using a home planning application of the electronic device to arrange furniture in a virtual room. In this case the virtual room includes icon user interface elements which represent a two-seat sofa 611, a three-seat sofa 613, a table 612, a desk 614 and a chair 615.

In this case, the user wants to have a larger table so, using the mouse, moves the cursor 695 to select the table user interface element 612. The user then enlarges the table by dragging the left edge of the table user interface element to the left (as shown in FIG. 6b).

As the user table user interface element 612 is enlarged it spatially interacts with the two seat sofa user interface element 611. In this case, the device/apparatus is configured to enable the provision of global differential haptic feedback 631 based on the particular spatial interaction between a plurality of user interface elements 611-615 of a graphical user interface.

In this case, the device/apparatus is configured to provide global differential haptic feedback 621 as the spatial interaction between the plurality of user interface elements are changing. In this case, the mouse 605 is enabled to provide the global differential haptic feedback 621 by being configured to vibrate with a frequency which is proportional to the area of overlap. In the situation depicted in FIG. 6b, when the user is enlarging the table user interface element 612 such that it spatially interacts with the two seat sofa user interface element 611, the mouse 605 is configured to provide vibration haptic feedback 621 with a low frequency because the degree of overlap 631 is relatively small.

When the user has enlarged the table user interface element 612 further such that the degree of overlap is larger (as shown in FIG. 6c), the frequency of the mouse vibration differential haptic feedback 621 is increased. In this embodiment, when the user has completed manipulating the user interface elements, the apparatus/device is configured to stop providing the global differential haptic feedback.

Like the embodiment of FIG. 4, this embodiment is also configured to provide location specific haptic feedback. That is, the apparatus/device is configured such that the mouse vibrates in a different way when the cursor is positioned within the spatial interaction region 631 of the plurality of user interface elements 611-615 than when the cursor is configured to be in a position outside the interaction region of the plurality of user interface elements. In this way, the user can explore the location and extent of the spatial interaction using mouse movement around the display.

It will be appreciated that in other embodiments, the apparatus/device may be configured to provided differential haptic feedback in different ways. For example, the apparatus/device may be configured to change the consistency of the haptic feedback. For example, when the degree of spatial interaction is small, the device/apparatus may be configured to provide intermittent haptic feedback with small bursts of haptic feedback separated by large gaps. As the degree of spatial interaction increases, the apparatus/device may be configured to increase the duration of the haptic feedback bursts and/or decrease the duration of the separating gaps. When there is a large spatial interaction, the device/apparatus may be configured to provide the haptic feedback continuously.

It will be appreciated that other embodiments may allow the user to manipulate user interface elements in three dimensions. In this case, the degree of spatial interaction may be measured in terms of volume.

Figure 7A:
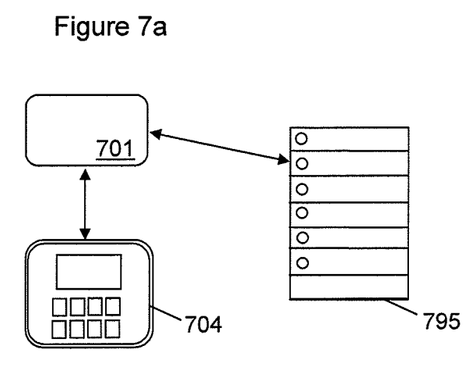
FIGS. 7a-7b illustrate an example apparatus in communication with a remote server/cloud.
Figure 7B:
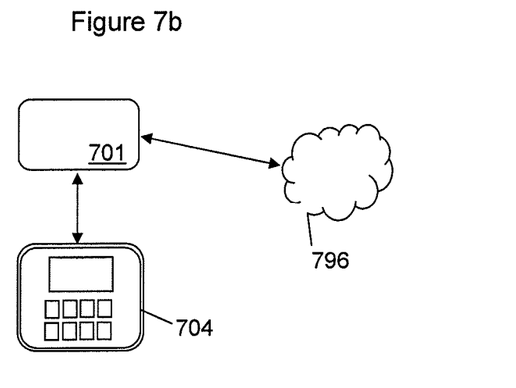

FIG. 7a shows that an example embodiment of an apparatus in communication with a remote server. FIG. 7b shows that an example embodiment of an apparatus in communication with a "cloud" for cloud computing. In FIGS. 7a and 7b, apparatus 701 (which may be apparatus 101, 201 or 301 is in communication with a display 704). Of course, the apparatus 701 and display 704 may form part of the same apparatus/device, although they may be separate as shown in the figures. The apparatus 701 is also in communication with a remote computing element. Such communication may be via a communications unit, for example. FIG. 7a shows the remote computing element to be a remote server 795, with which the apparatus may be in wired or wireless communication (e.g. via the internet, Bluetooth, a USB connection, or any other suitable connection as known to one skilled in the art). In FIG. 7b, the apparatus 701 is in communication with a remote cloud 796 (which may, for example, by the Internet, or a system of remote computers configured for cloud computing). It may be that the functions associated with the user interface elements are stored at the remote computing element 795, 796) and accessed by the apparatus 701 for display 704. The enabling may be performed at the remote computing element 795, 796. The apparatus 701 may actually form part of the remote sever 795 or remote cloud 796. In such embodiments, enablement of the provision of feedback may be conducted by the server or in conjunction with use of the server.

Figure 8:
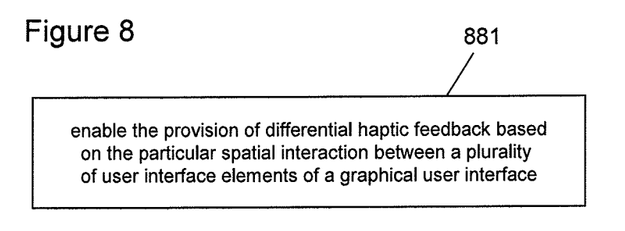
FIG. 8 illustrates a flowchart according to an example method of the present disclosure.

FIG. 8 illustrates the process flow according to an example embodiment of the present disclosure. The process comprises enabling 881 the provision of differential haptic feedback based on the particular spatial interaction between a plurality of user interface elements of a graphical user interface.

Figure 9:
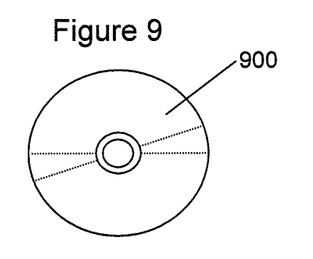
FIG. 9 illustrates schematically a computer readable medium providing a program.

FIG. 9 illustrates schematically a computer/processor readable medium (900) providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to example embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, the apparatus comprising:
   at least one processor; and
   at least one memory including computer program code,
   the at least one memory and the computer program code configured, with the at least one processor, to cause the apparatus to perform at least the following:
   enable the provision of differential haptic feedback to a user based on a degree of spatial interaction between a plurality of different user interface elements of a graphical user interface, wherein the differential haptic feedback is based on the degree of the spatial interaction.

2. The apparatus of claim 1, wherein the apparatus is configured to enable the provision of a first haptic feedback in the spatial interaction region of the plurality of different user interface elements and a second different haptic feedback in the spatial region outside the interaction region of the plurality of different user interface elements.

3. The apparatus of claim 1, wherein the apparatus is configured such that the haptic feedback is dependent on one or more of:
   the degree of overlap between the plurality of different user interface elements; and
   the degree of contact between the plurality of different user interface elements.

4. The apparatus of claim 1, wherein the apparatus is configured to enable the provision of the differential haptic feedback when a stylus is detected within the detection range of the graphical user interface.

5. The apparatus of claim 1, wherein the apparatus is configured to provide differential haptic feedback based on haptic feedback associated with the plurality of different user interface elements when the user interface elements are not spatially interacting.

6. The apparatus of claim 1, wherein the apparatus is configured such that the differential haptic feedback is dependent on which of the plurality of different user interface elements overlies with which other spatially interacting user interface element.

7. The apparatus of claim 1, wherein the apparatus is configured to provide differential haptic feedback by changing one or more of:
   the waveform of the haptic feedback;
   duration of haptic feedback;
   the consistency of haptic feedback;
   the strength of haptic feedback.

8. The apparatus of claim 1, wherein the apparatus is configured to determine the spatial interaction.

9. The apparatus of claim 1, wherein the spatial interaction comprises a spatial interaction in at least one of one, two and three dimensions.

10. The apparatus of claim 1, wherein at least one of the plurality of different user interface elements is configured to be selectable to actuate an associated function performable using an electronic device.

11. The apparatus of claim 1 wherein at least one of the plurality of different user interface elements is an object provided by the graphical user interface and which can be manipulated by the user but which cannot be used to perform a function with the electronic device.

12. The apparatus of claim 1, wherein the spatial interaction is enabled using manipulation of one or more of the plurality of different user interface elements.

13. The apparatus of claim 1, wherein the apparatus is configured to enable the provision of the differential haptic feedback in real time as the user is interacting with the user interface elements.

14. The apparatus of claim 1, wherein the haptic feedback is provided using one or more of: an array of haptic actuators; piezo-transducers, electro-active polymers, and electro tactile materials.

15. The apparatus of claim 1, wherein the apparatus comprises one or more of: an array of haptic actuators; piezo-transducers, electro-active polymers, and electro tactile materials to provide the differential haptic feedback.

16. The apparatus of claim 1, wherein the apparatus comprises the graphical user interface configured to provide the plurality of different user interface elements as display outputs.

17. The apparatus of claim 1, wherein the apparatus is a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

18. A method, the method comprising:
enabling the provision of differential haptic feedback to a user based on a degree of spatial interaction between a plurality of different user interface elements of a graphical user interface, wherein the differential haptic feedback is based on the degree of the spatial interaction.

19. A non-transitory computer readable medium comprising computer program code, the computer program code being configured to perform at least the following:
enable the provision of differential haptic feedback to a user based on a degree of spatial interaction between a plurality of different user interface elements of a graphical user interface, wherein the differential haptic feedback is based on the degree of the spatial interaction.

* * * * *

UNITED STATES PATENT AND TRADEMARK OFFICE
CERTIFICATE OF CORRECTION

PATENT NO. : 9,202,350 B2
APPLICATION NO. : 13/720228
DATED : December 1, 2015
INVENTOR(S) : Kyllonen et al.

It is certified that error appears in the above-identified patent and that said Letters Patent is hereby corrected as shown below:

On the Title page,
Item (71) Applicant: "Nokia Corporation Oy" should read --Nokia Technologies Oy--.

Signed and Sealed this
Ninth Day of August, 2016

Michelle K. Lee
*Director of the United States Patent and Trademark Office*